United States Patent [19]
Zablotney et al.

[11] Patent Number: 5,502,450
[45] Date of Patent: Mar. 26, 1996

[54] SINGLE ANTENNA DIRECTION-FINDING SYSTEM

[75] Inventors: Joseph H. Zablotney, Oakton; Steven F. Gorman, Falls Church, both of Va.

[73] Assignee: E-Systems, Inc., Dallas, Tex.

[21] Appl. No.: 276,992

[22] Filed: Jul. 19, 1994

[51] Int. Cl.⁶ .................................................. G01S 3/02
[52] U.S. Cl. ........................................ 342/451; 364/460
[58] Field of Search .................................. 342/450, 451; 364/458, 460, 462

[56] References Cited

U.S. PATENT DOCUMENTS

| | | | |
|---|---|---|---|
| 3,706,096 | 12/1975 | Hammack. | |
| 3,710,331 | 1/1973 | Kiisk. | |
| 3,866,229 | 2/1975 | Hammack. | |
| 4,558,323 | 12/1985 | Golinsky | 342/458 |
| 4,734,702 | 3/1988 | Kaplan | 342/424 |
| 4,910,526 | 3/1990 | Donnangelo et al. | 342/455 |
| 5,321,410 | 6/1994 | Hipp et al. | 342/442 |

*Primary Examiner*—Theodore M. Blum
*Attorney, Agent, or Firm*—Rogers & Killeen

[57] ABSTRACT

A method and system for determining the direction and range to a signal source from a single movable antenna. The direction and range are determined by the simultaneous solution of trigonometric equations which describe triangles including the source and at least two positions assumable by the antenna as apices. The simultaneous equations incorporate the distances from the source to each antenna position as triangle sides and the determination of the relationship between these sides provides for the solution of the equations. The relationship of the triangle sides is determined by detecting periodic symbols occurring in the source signal while the antenna is moved through multiple positions. Actual symbol occurrences corresponding to each antenna position are detected. The expected occurrences at the first antenna position of the symbols actually occurring at the subsequent antenna positions are determined. The differences between the actual and expected symbol occurrences indicate the change in the distance travelled by the signal to each antenna position relative to the distance travelled to the first antenna position. Accordingly the distance from the source to each antenna position may be described as a function of the distance to the first antenna position and the simultaneous equations may be solved for direction and range to the source from any of the antenna positions.

25 Claims, 2 Drawing Sheets

SINGLE ANTENNA DIRECTION-FINDING SYSTEM

BACKGROUND OF THE INVENTION

The invention relates to methods and apparatus for determining the location of a signal source. The determination of the source location may include determining the direction and range to the source from an antenna which receives the source signal.

Presently, there are methods for determining direction and range to a signal source. In one such method, disclosed for example in U.S. Pat. No. 4,339,755 to Wright, a pair of antennas spaced apart by a known distance may be utilized to receive a signal from the source. The antennas are arranged such that a given feature of the signal is received by one antenna before the other antenna due to the different travel distances for the signal to each antenna. The temporal relationship of the signal received by the two antennas may be used to determine the difference (DELTA) in travel distance to one antenna relative to the other.

A right triangle may then be formed where the two antennas are apices, and the third apex is located at a distance DELTA from the further antenna along the line between the antenna and the source. The distance between the antennas corresponds to one side of the triangle while the distance DELTA corresponds to a second side. A trigonometric equation relates the sides and angles of the right triangle and the equation may be solved for the direction to the source from one antenna.

Triangulation techniques may be utilized to determine the range to the source using two or more direction to source determinations.

A disadvantage of the prior art direction and range to source methods is that they require the use of two or more antennas and receivers. As these systems are often installed on an aircraft, the added weight and space allocation of the additional antennas may pose a problem, particularly in smaller aircraft where weight and space considerations are critical.

The direction to source resolution of prior art systems is limited by the separation distance of the antennas on the aircraft. The separation of the antennas is limited by the dimensions of the aircraft and is typically very small in relation to the distance to the source. The relatively small separation of the antennas means that even a very slight error in the detection of the source signal may cause a large error in the direction to source determination.

Embodiments of the present invention also utilize trigonometric relations to solve for the direction and range to a signal source. Unlike the prior art however, a single antenna and receiver are employed to receive the signal emitted from the source and make the necessary detections.

The received signal carries precisely repetitive symbols which enables the detection of symbols and the prediction of expected future occurrences of symbols. The single antenna system is used to detect the actual occurrence of signal symbols as the antenna is moved through several antenna positions. A prediction is made of the expected symbol occurrences at the antenna positions based upon the known repetition rate of the symbols at a first antenna position. A comparison of the actual and expected symbol occurrences for each antenna position indicates the change in the distance between each antenna position and the source relative to the distance between the first antenna position and the source. Accordingly, the distance between each antenna position and the source may be described as a function of the distance between the first antenna position and the source.

The determination of the functional relationship of the distances between each of the antenna positions and the source enable the solution of trigonometric equations for the direction and range to the source from any of the antenna positions.

It is accordingly an object of the invention to provide a method and apparatus which may require only a single antenna for determination of the direction and range to a signal source from a position of the antenna.

It is another object of the invention to provide a method and apparatus which may rely upon a signal having periodic symbols in order to predict the expected future occurrences of the signal symbols and so that a determination of the change in the distance between an antenna position and the source relative to another antenna position can be made by comparing expected and actual symbol occurrences.

It is yet another object of the invention to make a temporal comparison of expected and actual symbol occurrences.

It is still another object of the invention to make a phase comparison of expected and actual symbol occurrences.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

Figure 1:
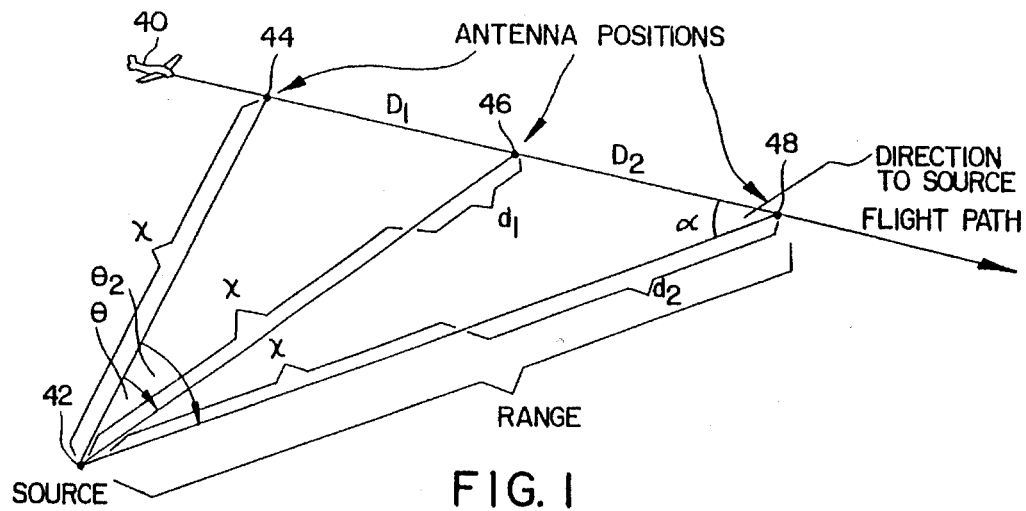
FIG. 1 is a schematic diagram showing the geometrical relationship of three exemplary collinear antenna positions and a signal source.

With reference to FIG. 1, it may be desired to determine the direction to a signal source 42 from an aircraft 40 which provides a moving platform for an antenna along a flight path through first, second and third collinear antenna positions 44, 46 and 48, respectively.

It is evident from FIG. 1 that the points of the source 42, and the first, second and third antenna positions may be grouped in sets of three to define three triangles. The triangles are those with apices at (a) the source, and the first and second antenna positions, (b) the source, and the first and third antenna positions, and (c) the source, and the second and third antenna positions.

Simultaneous equations describing the relationship between the sides and angles of the aforementioned triangles may be formulated. These equations may be solved for the direction to source, i.e., angle $\alpha$ in FIG. 1, and for the RANGE to the source after certain determinations of the triangle side lengths are made.

FIG. 1 shows angle $\alpha$ and RANGE from the third antenna position 48, however direction to source and RANGE determinations may be made from any one of the shown antenna positions.

As shown in FIG. 1, the sides of each of the three possible triangles may be described using some combination of the distances $d_1$, $d_2$, $D_1$, $D_2$, and x, with the triangle sides being selected from the group of $D_1$, $D_2$, $(D_1+D_2)$, x, $(x+d_1)$, and $(x+d_2)$.

Embodiments of the invention provide for the determination of the distances $d_1$, $d_2$, $D_1$, and $D_2$. Once these distances are determined, the sides of any of the three possible triangles may be described using only one unknown, x. For example, the triangle with apices at the source, and first and third antenna positions has the sides x, $(D_1+D_2)$, and $(x+d_2)$.

Furthermore, the relationship between the sides and an angle of each triangle may be represented using an equation (1) of the form:

$$a^2 = b^2 + c^2 - 2bc(\cos A), \quad (1)$$

where a, b, and c are side lengths and angle A is opposite side a.

The simultaneous equations describing the three possible triangles may be formulated using equation (1), where the triangle sides are described in terms of x, $D_1$, $D_2$, $d_1$ and $d_2$. The simultaneous equations may be solved using a computer to determine angle $\alpha$ and the RANGE.

With reference to FIG. 1, one set of simultaneous equations may be:

$$x^2 = (D_1+D_2)^2 - 2(D_1+D_2)(x+d_2)(\cos(\alpha)) \quad (2A)$$

$$(x+d_1)^2 = (D_2)^2 + (x+d_2)^2 - 2(D_2)(x+d_2)(\cos(\alpha)) \quad (2B)$$

where the two unknowns are x and $\alpha$. An alternative set may be:

$$(D_1+D_2)^2 = X^2 + (x+d_2)^2 - 2(x)(x+d_2)(\cos(\theta_2)) \quad (3A)$$

$$(D_1)^2 = x^2 + (x+d_1)^2 - 2(x)(x+d_1)(\cos(\theta_1)) \quad (3B)$$

$$(D_2)^2 = (x+d_1)^2 + (x+d_2)^2 - 2(x+d_1)(x+d_2)(\cos(\theta_2-\theta_1)) \quad (3C)$$

where the three unknowns are x, $\theta_1$, and $\theta_2$.

A computer may be used to solve the above equations and provide an output which may include any of the unknowns and the direction and distance to the source from an antenna position, with the direction to the source being angle $\alpha$, and the RANGE being $(x+d_2)$, $(x+d_1)$, or x, depending upon the antenna position from which RANGE is determined.

The distance $D_1$ between the first and second antenna positions, and the distance $D_2$ between the second and third antenna positions may be readily determined using existing navigational means known in the prior art.

In the situation shown in FIG. 1, the first antenna position 44 may be assumed to be an unknown distance x from the source 42. Furthermore, the third antenna position 48 may be farther from the source than the second antenna position 46, and the second antenna position 46 may be farther from the source than the first antenna position 44. Because the second antenna position 46 is farther from the source 42 than the first antenna position 44, the signal necessarily travels the unknown distance x plus distance $d_1$ or $(x+d_1)$ in order to reach the second antenna position 46. Likewise the signal travels the distance $(x+d_2)$ to reach the third antenna position 48. If the second and third antenna positions were closer to the source than the first antenna position, the signal travel distances would alternatively be defined as $(x-d_1)$ and $(x-d_2)$.

In one embodiment of the invention the determination of $d_1$ and $d_2$ may begin with the aircraft 40 receiving a continuous signal from the source 42 prior to the antenna's assumption of the first antenna position 44. Periodically occurring symbols may be derived from the received signal and detected by a system on board the aircraft.

While at the first antenna position 44, a symbol detector may detect the occurrence of a symbol, in turn the computer may use a received clock signal to detect the time of the symbol occurrence $T_1$ at the first antenna position. The time of symbol occurrence at the first antenna position may be required only as a reference from which the times of subsequent occurrences of the same symbol may be measured.

In lieu of detecting the time of occurrence of a single symbol at an antenna position, the computer may detect the times of occurrence of a number of successive symbols in a sample. The time of symbol occurrence may then be determined to be the average time of occurrence for all the symbols in the sample. This alternate method of determining the time of symbol occurrence at an antenna position may enhance the accuracy of the determination.

The computer may also determine the signal symbol rate SR at the first antenna position 44. The symbol rate may be determined by counting the number of symbols occurring in a sample of successively occurring symbols for a measured time period as the antenna passes through the first antenna position.

Respective detections of the times of symbol occurrence $T_2$ and $T_3$ at the second and third antenna positions may be made by the computer in a manner like that used for the detection of the time of symbol occurrence $T_1$ at the first antenna position.

The computer may also count the number of symbol occurrences $N_1$ and $N_2$ between the symbol occurrences at the first and second, and second and third antenna positions, respectively.

Knowing the number of symbol occurrences $N_1$ and $N_2$, and knowing the symbol rate SR allows for the computation of the expected times of symbol occurrences $Te_2$ and $Te_3$ at the first antenna position of the actual symbol occurrences detected at the second and third antenna positions. The expected times of occurrence $Te_2$ and $Te_3$ are computable due to the periodic nature of the symbol occurrences, previously noted. The formula used to determine the expected times of occurrence $Te_2$ and $Te_3$ may be:

$$Te_2 = N_1/SR \text{ and } Te_3 = N_2/SR. \quad (4)$$

The difference between the expected time of occurrence $Te_2$ and the actual time of symbol occurrence at the second antenna position $T_2$ is the amount of time it took the signal to travel the distance $d_1$ to the second antenna position. The distance $d_1$ may be computed using the formula:

$$d_1 = (T_2 - Te_2)(c) \quad (5)$$

where c is the local speed of light.

Likewise, the distance $d_2$ may be determined using the formula:

$$d_2 = (T_3 - Te_3)(c) \quad (6)$$

A second embodiment of the invention provides an alternate method of determining the distances $d_1$ and $d_2$.

With continued reference to FIG. 1, a symbol and phase detector in conjunction with the computer, while at the first antenna position 44, may detect the time of occurrence $T_1$ of a symbol, $T_1$ being required only as a reference from which the times of subsequent symbol occurrences may be measured.

The computer may also determine the signal symbol rate SR at the first antenna position 44 in the manner previously described.

Respective detections may be made at the second and third antenna positions of actual signal symbol phases $Pa_2$ and $Pa_3$, and the times of occurrences for these symbol phases $T_2$ and $T_3$.

Expected symbol phases $Pe_2$ and $Pe_3$ at the first antenna position corresponding to the times of actual symbol occurrence at the second and third antenna positions may be computed using the symbol rate SR, and the times of symbol occurrence $T_2$ and $T_3$ at the second and third antenna positions. The formulas used may be:

$$Pe_2 = (SR)(T_2 - T_1) \tag{7}$$

and $$Pe_3 = (SR)(T_3 - T_1) \tag{8}$$

The computer may count the respective number of symbol occurrences $N_1$ and $N_2$ between the symbol occurrences at the first and second antenna positions, and the second and third antenna positions. Knowing the number of symbol occurrences $N_1$ and $N_2$ in conjunction with the above determined and detected data allows for the determination of the distances $d_1$ and $d_2$ using the following formulas:

$$d_1 = (Pe_2 - Pa_2 - N_2)(c/SR) \tag{9}$$

and $$d_2 = (Pe_3 - Pa_3 - N_2)(c/SR) \tag{10}$$

Figure 2:
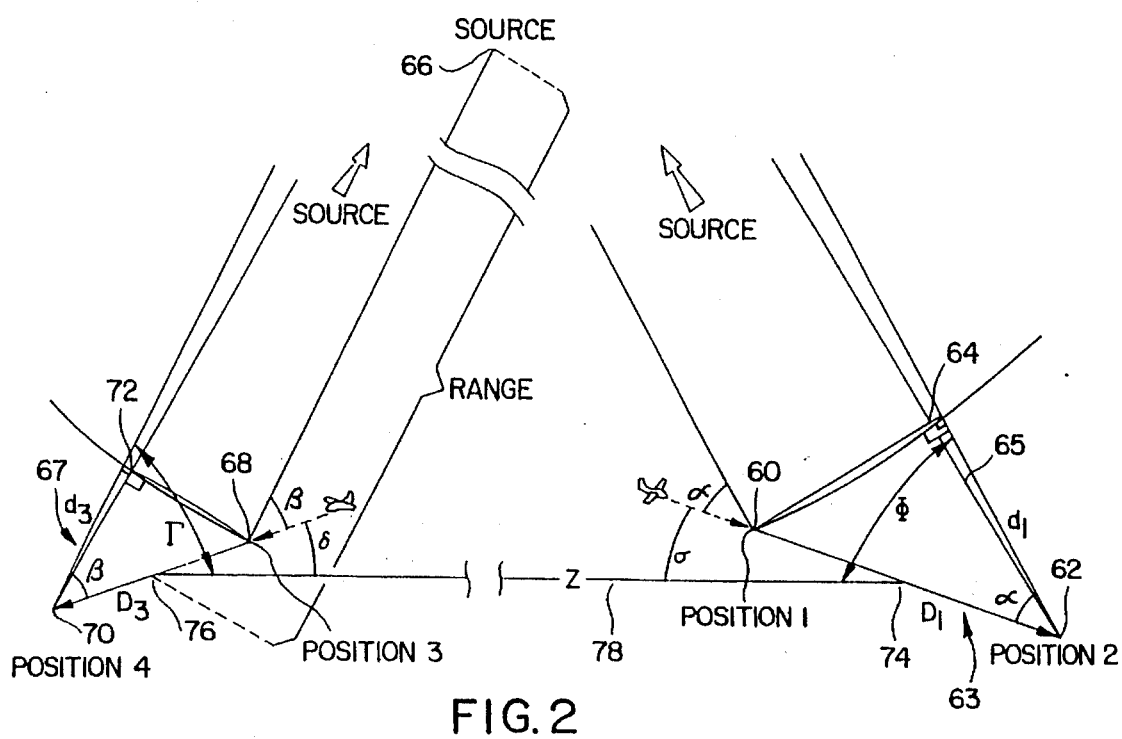
FIG. 2 is a schematic diagram showing the geometrical relationship of exemplary non-collinear antenna positions and a signal source.

With reference to FIG. 2, a third embodiment of the invention provides for the determination of the direction to the source from the second antenna position knowing only the distance $d_1$. The distance $d_1$ may be determined using any of the previously described methods.

In FIG. 2, the angle $\alpha$ is the angle between the line joining the first and second antenna positions, 60 and 62 respectively, and the line between the second antenna position 62 and the signal source 66. Angle $\alpha$ indicates the direction to the signal source 66 from the second antenna position 62.

A first triangle 63 may include angle $\alpha$, the triangle is defined by three apices: (i) the first antenna position 60, (ii) the second antenna position 62, and (iii) a first intersection 64 of (a) a direction to source line 65 between the second antenna position 62 and the signal source 66 and (b) a line extending from the first antenna position 60 which is perpendicular to the direction to source line 65. The direction to source line 65 is noted for being nearly parallel with the line between the first antenna position 60 and the signal source 66.

A second triangle 67 is defined by the apices of (i) the third antenna position 68, (ii) the fourth antenna position 70, and (iii) a second intersection point 72. The second triangle 67 may include an angle $\beta$ lying between the line joining a third antenna position 68 and a fourth antenna position 70 and the line between the fourth antenna position 70 and the source 66. Angle $\beta$ indicates the direction to the signal source from the fourth antenna position 70.

An underlying assumption of the third embodiment of the invention is that the distance between the signal source and each of the antenna positions is great in comparison to the distances between the first and second antenna positions and between the third and fourth antenna positions.

Since the distance between the first and second antenna positions is small in comparison to the distance from each antenna position to the signal source, the direction to source lines extending from the first and second antenna positions to the signal source may be considered to be parallel. Similarly the direction to source lines extending from the third and fourth antenna positions may be considered to be parallel. Accordingly the first and second triangles 63 and 67 may be considered to have right angles at their respective intersection points 64 and 72.

With reference to the first triangle 63, the two sides of the triangle shown as $D_1$ and $d_1$ are known. It is also known that the triangle is a right triangle having the side $D_1$ as a hypotenuse. Accordingly, the angle $\alpha$ may be determined using the formula:

$$\beta = \arcsin(d_2/D_3). \tag{11}$$

Similarly, the angle $\alpha$ may be determined using the formula:

$$\beta = \arcsin(d_3/D_3). \tag{12}$$

In order to determine the RANGE to the source 66 from the fourth antenna position 70, the grouping of the first and second antenna positions may be sufficiently distant from the grouping of the third and fourth antenna positions such that the angles $\alpha$ and $\beta$ are not equal.

The determination of the RANGE involves the solution of a third triangle defined by the apices of (i) the source 66, (ii) a first midpoint 74 of side $D_1$ of the first triangle 63, and (iii) a second midpoint 76 of side $D_3$ of the second triangle 67.

A first side 78 of the third triangle is known to be the distance Z between the first midpoint 74 and the second midpoint 76. Distance Z may be determined using conventional navigational position detection means.

With continued reference to FIG. 2, the angles $\chi$ and $\Gamma$ may be determined next. There are two possible situations which may exist with regard to angles $\Phi$ and $\Gamma$.

In a first situation, where the first, second, third and fourth antenna positions are collinear, angle $\Phi$ is equal to angle $\alpha$, and angle $\Gamma$ is equal to angle $\beta$.

When the four antenna positions are not collinear, angle $\Phi$ may be equal to the sum of angle $\alpha$ and angle $\sigma$, angle $\sigma$ lying between the first side 78 of the third triangle and the side $D_1$ of the first triangle 63. Likewise, angle $\Gamma$ may be equal to the sum of angle $\beta$ and angle $\delta$, angle $\delta$ lying between the first side 78 of the third triangle and the side $D_3$ of the second triangle 67.

The angles $\sigma$ and $\delta$ may be determined using position and heading information for the antenna while the antenna was at the first and second midpoints, 74 and 76. The antenna position indicator may provide any position and heading information to the computer for calculations.

After the angles $\Phi$ and $\Gamma$ have been determined, the RANGE may be determined using the formula:

$$RANGE = (Z) [\sin(180 - \Phi)/\sin(\Phi - \Gamma)]. \tag{13}$$

Figure 3:
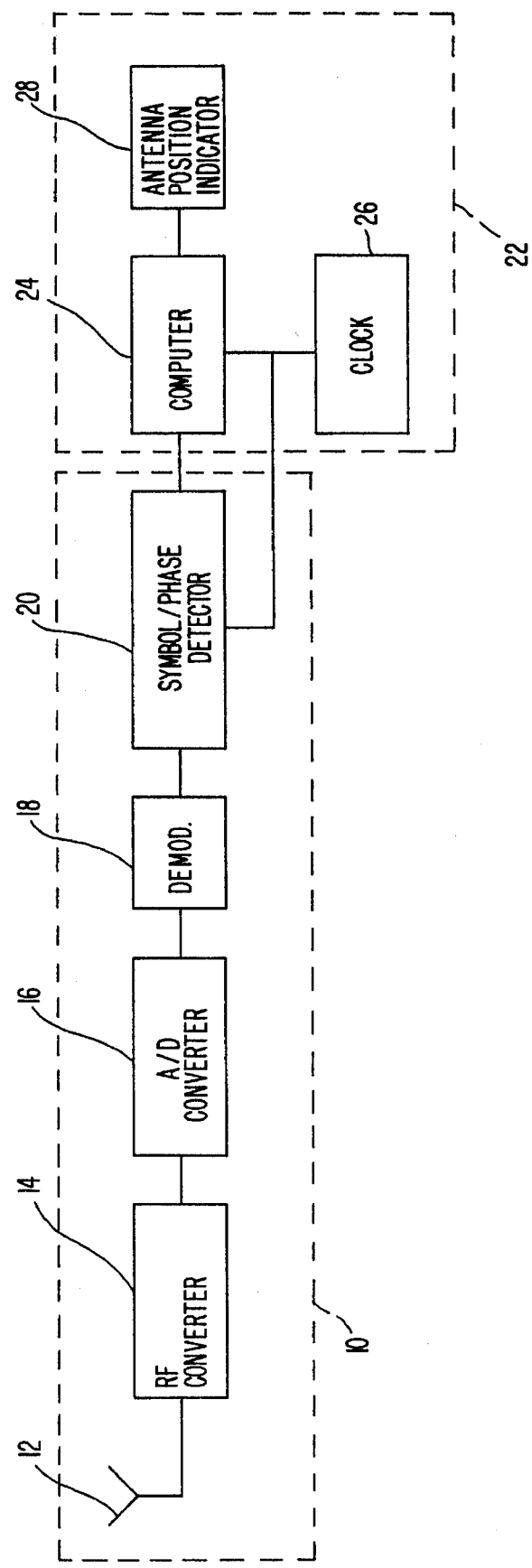
FIG. 3 is a functional block diagram showing one embodiment of the apparatus of the present invention.

As shown in FIG. 3, embodiments of the invention may utilize apparatus comprised of a first means 10 for (a) signal reception and conversion to a signal having periodic symbols and (b) detection of the symbols, and a second means 22 for performing calculations.

The first means 10 may include an antenna 12, a radio frequency (RF) converter 14, an analog to digital (A/D) converter 16, a demodulator 18, and a symbol and phase detector 20.

The antenna 12 may be any suitable conventional single antenna or antenna array capable of continuously receiving a signal of interest from the source to which the direction is to be determined and may be mounted on a movable platform such as an aircraft, ship, submarine or land vehicle. The entire apparatus shown in FIG. 3 may be carried on board an aircraft or other vehicle.

The output signal from the antenna may be applied to the RF converter 14 which converts the signal from a central band frequency to a baseband frequency of the same bandwidth as the received signal. Following conversion to baseband, the signal may be digitized in the A/D converter 16 and demodulated in the demodulator 18 into a signal having periodic symbols. The occurrence of a symbol may then be detected by the symbol and phase detector 20. The RF converter 14, the A/D converter 16, the demodulator 18 and detector 20 may each be any suitable conventional circuit with the requisite functional capabilities.

A symbol occurrence may be marked by the leading edge, trailing edge, zero-transition point or other recognizable symbol feature. As the symbols are periodic and generated in accordance with a highly stable clock, the same recurring symbol may be detected at precisely spaced intervals in the absence of antenna movement and provides a basis for the measurement of the phase of the signal.

The precise spacing of the symbol occurrences provides for the prediction of expected symbol occurrence in the future. The operation of all embodiments of the invention depend upon this ability to predict future symbol occurrences. Embodiments of the invention may utilize the prediction of time, phase or another characteristic of a symbol in the determination of the direction to the source.

Signal phase, when required, may be determined by first filtering the baseband signal to determine the spectral components of the signal. Thereafter a discrete fourier transform may be performed to complete spectral analysis, with the signal phase appearing as the spectral line corresponding to the symbol rate. The phase measurement currently may relate a subsequent symbol occurrence to the leading edge of the same symbol at the anticipated position.

Following detection by the symbol and phase detector 20, symbol occurrence data and phase measurements may be provided to the second means 22 for performing calculations.

The computer 24 may receive (a) symbol occurrence and phase measurement data from the symbol and phase detector 20, (b) highly stable clock signal data from the clock 26, and (c) antenna position data from the indicator 28. The computer may make determinations of relative signal symbol time of occurrence, relative signal phase at the time of occurrence, and rate of symbol occurrence as well as various mathematical computations.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed:

1. A method of determining the direction from a single antenna movable along a path to a source of a continuous signal having a stable symbol rate comprising the steps of:
   a) detecting the occurrence of a first symbol in said signal at a first position along path of antenna movement;
   b) determining a first difference in terms of an unknown distance between the signal source and the first antenna position, between (i) an expected occurrence of a second symbol at the first antenna position and (ii) an actual occurrence of the second symbol at a second antenna position a first known distance from the first antenna position, and determining a second difference in terms of the unknown distance, between (i) an expected occurrence of a third symbol at the first antenna position and (iii) an actual occurrence of the third symbol at a third antenna position a second known distance from the first antenna position; and
   c) determining the direction to the source relative to the path of antenna movement from one of the antenna positions by the simultaneous solution of equations for at least two triangles in the form $a^2=b^2+c^2-2bc(\cos \alpha)$, where $\alpha$ is the angle between the path of antenna movement and the direction to the source to be determined.

2. The method of claim 1 wherein the antenna position of step (c) is the third antenna position and the two triangles are those having apices respectively at (a) the third position, the source and the first position and (b) the third position, the source and the second position.

3. The method of claim 1 wherein step (c) is accomplished by first determining the three included angles, in terms of two of the included angles, at the signal source of the three triangles formed with an apex at the source and two other apices selected from the group consisting of the first, second and third antenna positions.

4. The method of claim 1 wherein the differences between the expected and actual occurrences of the symbols are determined as time differences and are converted to distances using the local speed of light as a conversion factor.

5. The method of claim 4, wherein
   step (a) is accomplished by detecting the time of occurrence $T_1$ of the symbol at the first antenna position; and
   step (b) is accomplished by,
   i) continuing to receive the signal while moving the antenna to the second antenna position,
   ii) detecting the time of occurrence $T_2$ of the second symbol at the second antenna position at a known number of symbol occurrences $N_1$ after $T_1$,
   iii) determining the expected time of occurrence $Te_2$ of the second symbol at the first antenna position based on the symbol rate SR and the number of symbols $N_1$ occurring between times $T_1$ and $T_2$,
   iv) determining the extra distance "d" travelled by the signal between times $Te_2$ and $T_2$ using the formula:

$$d=(T_2-Te_2)(c),$$

where c is the local speed of light,
   v) repeating steps (i) through (iv) at least once to determine additional distances d travelled by the signal between expected time of occurrence and actual time of occurrence determinations for the third antenna position and possible subsequent antenna positions, and
   vi) designating the respective distances between the source and each of the second, third and subsequent antenna positions to be the unknown distance between the source and the first antenna position plus the respective distances d corresponding to each of the second, third and subsequent antenna positions.

6. The method of claim 5, wherein a sample of more than one symbol occurrence is detected at each of the antenna positions and the times of occurrence of the symbols $T_1$ and $T_2$ at each of the antenna positions are in each of the samples.

7. The method of claim 6 wherein the actual occurrences of the symbols are marked by a zero-crossing transition.

8. The method of claim 7, further comprising the step of: determining the range to the signal source from an antenna position by simultaneous solution of the equations called for in step (c).

9. The method of claim 8 wherein the continuous signal has a base band which is digitally modulated; and including the steps before step (a) of:
   i) providing an operational signal related to the base band modulation, and
   ii) performing the operative steps (a) and (b) on the operational signal.

10. The method of claim 1 wherein the first and second differences are determined as signal phase differences and are converted to distances using the symbol rate and local speed of light as conversion factors.

11. The method of claim 10, wherein step (b) is accomplished by,
   i) continuing to receive the signal while moving the antenna to the second antenna position,
   ii) detecting the actual phase $Pa_2$ of the second symbol at the second antenna position at a known number of symbol occurrences $N_1$ and a known time $T_2$ after the occurrence of the first symbol at the first antenna position,
   iii) determining the expected phase $Pe_2$ of the second symbol at the first antenna position based on the time $T_2$, and the symbol rate SR,
   iv) determining the extra distance "d" travelled by the signal to the second antenna position relative to the distance travelled to the first antenna position using the formula:

$$d=(Pe_2-Pa_2-N_1)(c/SR),$$

where c is the local speed of light,
   v) repeating steps (i) through (v) at least once to determine additional distances d travelled by the signal for the third antenna position and possible subsequent antenna positions, and
   vi) designating the respective distances between the source and each of the second, third and subsequent antenna positions to be the unknown distance between the source and the first antenna position plus the respective distances d corresponding to each of the second, third and subsequent antenna positions.

12. The method of claim 11 wherein the actual occurrences of the symbols are marked by a zero-crossing transition.

13. The method of claim 12, further comprising the step of:
   determining the range to the signal source from an antenna position by simultaneous solution of the equations called for in step (c).

14. The method of claim 13, wherein the continuous signal has a base band which is digitally modulated; and including the steps before step (a) of:
   i) providing an operational signal related to the base band modulation, and
   ii) performing the operative steps (a) and (b) on the operational signal.

15. The method of claim 1 wherein the actual occurrences of the symbols are marked by a zero-crossing transition.

16. The method of claim 1, further comprising the step of:
   determining the range to the signal source from an antenna position by simultaneous solution of the equations called for in step (c).

17. The method of claim 1, wherein the continuous signal has a base band which is digitally modulated; and including the steps before step (a) of:
   i) providing an operational signal related to the base band modulation, and
   ii) performing the operative steps (a) and (b) on the operational signal.

18. A method of determining the direction from a second antenna position of a single antenna movable along a path from a first to the second antenna position to a source of a continuous signal having a stable symbol rate where the distance "D" between the first and second antenna positions is negligible when compared to the distance from the source to the first and second antenna positions, the method comprising the steps of:
   a) detecting the occurrence of a first symbol at a first antenna position along a path of antenna movement;
   b) determining the distance "d" travelled by the signal at the speed of light between (i) an expected occurrence of a second symbol at the first antenna position and (ii) an actual occurrence of the second symbol at the second antenna position along the path of antenna movement by determining a time difference between the expected and actual occurrences and converting the time difference to a distance; and
   c) determining the direction to the source from the second antenna position by solving the equation $\alpha=\arcsin(d/D)$, where $\alpha$ is the included angle at the second antenna position between the path of antenna movement and the line between the second antenna position and the source.

19. The method of claim 18, further comprising the steps of:
   d) repeating steps (b) and (c) from third and fourth antenna positions to determine a second angle $\beta$ from the third and fourth positions to the source, the third and fourth antenna positions being sufficiently far from the first and second antenna positions such that the angles $\alpha$ and $\beta$ are unequal;
   e) determining the distance Z from a midpoint between the first and second antenna positions and a midpoint between the third and fourth antenna positions; and
   f) determining the RANGE to the signal source from the fourth antenna position using the formula $$RANGE=(X)\,[\sin(180-\Phi)/\sin(\Phi-\Gamma)]$$

where the angle $\Phi$ is either (1) equal to the angle $\alpha$ or (2) equal to the sum of the angle $\alpha$ and the angle $\sigma$ between (i) the line extending between the first and second antenna positions and (ii) the distance line Z, and
   where the angle $\Gamma$ is either (1) equal to the angle $\beta$ or (2) equal to the sum of (i) the angle $\beta$ and (ii) the angle $\delta$ between the line extending between the third and fourth antenna positions and the distance line Z.

20. Apparatus for determining the direction from a single antenna movable along a path to a source of a continuous signal having a stable symbol rate comprising:
   a) first means for detecting the occurrence of symbols at known spaced antenna positions along a path of antenna movement; and
   b) second means for determining
      (i) the difference, in terms of an unknown distance between the signal source and a first antenna position, between (1) an expected occurrence of a second symbol at the first antenna position and (2) an actual occurrence of the second symbol at one or more of the known spaced antenna positions, and (ii) the direction to the source from a final antenna position, the direction to the source being the angle between the path of antenna movement and the direction to the source to be determined.

21. The apparatus of claim 20 wherein said second means includes means for determining the difference between the expected and actual occurrences of the second symbol as a time difference and converting the time difference to a distance using the local speed of light as a conversion factor.

22. The apparatus of claim 21 wherein said second means includes means for solving the formula $a^2=b^2+c^2-2bc(\cos \alpha)$, where a, b and c are the sides of a triangle, and the angle $\alpha$ is included by sides b and c.

23. The apparatus of claim 22 wherein said second means includes means for determining the range from the final antenna position to the source.

24. The apparatus of claim 20 wherein said second means includes means for determining the difference between the expected and actual occurrences of the second symbol as a signal phase difference and converting the phase difference to a distance using the symbol rate and local speed of light as conversion factors.

25. In a method for determining the direction to a signal source from an antenna position by determining a difference in signal travel distance from the source to two spaced apart antenna positions and thereafter using trigonometric relations to determine the direction to the source, the improvement in the method of determining the difference in the signal travel distance comprising the steps of:

a) continuously receiving a signal having a stable symbol rate at a single antenna while moving the antenna along a path;

b) detecting actual occurrences of first and second symbols received respectively at first and second antenna positions; and c) determining the difference, in terms of an unknown distance between the signal source and the first antenna position, between (i) an expected occurrence of the second symbol at the first antenna position and (ii) the actual occurrence of the second symbol at the second antenna position.

* * * * *